US007327530B2

(12) United States Patent
Lee et al.

(10) Patent No.: US 7,327,530 B2
(45) Date of Patent: Feb. 5, 2008

(54) HARD DISK DRIVE HAVING DISK DAMPER AND DISK PROTECTOR

(75) Inventors: Jae-Suk Lee, Suwon-si (KR); Young-rok Oh, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 95 days.

(21) Appl. No.: 11/149,303

(22) Filed: Jun. 10, 2005

(65) Prior Publication Data

US 2006/0002007 A1    Jan. 5, 2006

(30) Foreign Application Priority Data

Jul. 3, 2004   (KR) ...................... 10-2004-0051804

(51) Int. Cl.
*G11B 33/14* (2006.01)
(52) U.S. Cl. .................................................. 360/97.02
(58) Field of Classification Search ... 360/97.01–97.04
See application file for complete search history.

(56) References Cited

U.S. PATENT DOCUMENTS

| 6,172,843 | B1 * | 1/2001 | Genheimer et al. ...... 360/97.01 |
| 6,226,144 | B1 | 5/2001 | Nagl et al. ............... 380/97.01 |
| 6,236,531 | B1 * | 5/2001 | Allsup et al. ............ 360/97.01 |
| 6,271,987 | B1 * | 8/2001 | Allsup et al. ............ 360/97.03 |
| 6,285,525 | B1 * | 9/2001 | McCutcheon et al. ... 360/98.08 |
| 6,424,487 | B2 | 7/2002 | Nagl et al. ............... 360/97.01 |
| 6,477,000 | B1 * | 11/2002 | Pottebaum et al. ...... 360/97.02 |
| 6,496,327 | B2 * | 12/2002 | Xia et al. ................. 360/97.03 |
| 6,542,328 | B2 * | 4/2003 | Harrison et al. ......... 360/97.03 |
| 7,106,553 | B2 * | 9/2006 | Kim ........................ 360/97.02 |
| 2003/0179493 | A1 * | 9/2003 | Kim ........................ 360/97.02 |
| 2005/0270691 | A1 * | 12/2005 | Pottebaum et al. ...... 360/97.02 |
| 2006/0066993 | A1 * | 3/2006 | Agematsu et al. ....... 360/97.03 |
| 2006/0171064 | A1 * | 8/2006 | Han et al. ................ 360/97.01 |

FOREIGN PATENT DOCUMENTS

| JP | 2000-149493 | 5/2000 |
| KR | 2003-0009124 | 1/2003 |
| KR | 2003-0086197 | 11/2003 |
| KR | 2007-117921 | * 5/2006 |

OTHER PUBLICATIONS

US 6,091,569, 07/2000, Allsup (withdrawn)

* cited by examiner

*Primary Examiner*—Allen Cao
(74) *Attorney, Agent, or Firm*—Staas & Halsey LLP

(57) ABSTRACT

A hard disk drive (HDD) having a disk damper and a disk protector. The HDD includes a base member, a spindle motor installed on the base member, a plurality of data storage disks mounted on the spindle motor, an actuator pivotably installed on the base member and moving a read/write head to specified positions over the disks, a disk damper disposed between adjacent disks of the plurality of disks and reducing vibrations of the disks, and a disk protector projecting by a specified height toward the disks form positions of top and bottom surfaces of the disk damper to correspond to outer edges of the disks where data is not recorded. Accordingly, if the disks are deflected due to an external shock, only the outer edges of the disks contact the disk protector, thereby preventing data recording surfaces of the disks from being damaged.

17 Claims, 3 Drawing Sheets

HARD DISK DRIVE HAVING DISK DAMPER AND DISK PROTECTOR

This application claims the priority of Korean Patent Application No. 2004-0051804, filed on Jul. 3, 2004, in the Korean Intellectual Property Office, the disclosure of which is incorporated herein by reference.

BACKGROUND OF THE INVENTION

1. Field of the Invention

The present invention relates to a hard disk drive (HDD), and more particularly, to a HDD having a disk damper for damping the vibrations of rotating disks and a disk protector for protecting recording surfaces of the disks from an external shock.

2. Description of Related Art

Hard disk drives (HDDs) that store information on computers read or write data on a disk using a read/write head. In an HDD, the read/write head performs its function by being moved by an actuator to a desired position a specified height over a recording surface of the rotating disk.

HDDs include a spindle motor, one or more data storage disks mounted on the spindle motor, and an actuator for moving a read/write head for reading and writing data to a specified position on the disks.

The disk, the spindle motor, and the actuator are surround by a housing consisting of a base member and a cover member. The base member and the cover member are assembled using a plurality of fastening screws.

In an HDD constructed as above, the rotating disks may flutter due to structural defects of the spindle motor, deflection of the disks during an assembly process and turbulent air flow inside the HDDs. In particular, non-negligible air flow is generated around the rapidly rotating disks, for example, in a space between the disks. The air flow causes the disks to vibrate and interfere with data writing and reading operations of the read/write head, thereby negatively affecting the performance of the HDDs.

In an attempt to solve the problems, it is known to insert a thin plate-shaped disk damper has been between adjacent disks. The disk damper can deaden the vibrations of the disks by damping effect of the compressed air between the disks.

However, if an abrupt external impact is applied to the HDD having the disk damper (e.g., during a shock test), the disks are deflected and easily contact the disk damper, thereby damaging data recording surfaces of the disks. Further, it is also probable that the disk damper will make contact with the disks during the installation of the disk damper, thereby damaging the data recording surfaces of the disks.

BRIEF SUMMARY

An aspect of the present invention provides a disk damper on which a disk protector is formed to protect data recording surfaces of disks from an external shock, and a hard disk drive having the disk damper.

According to an aspect of the present invention, there is provided a disk damper, which is disposed between adjacent disks of a plurality of disks mounted on a spindle motor of a hard disk drive and reduces vibrations of the disks, the disk damper comprising: a disk protector projecting by a specified height toward the disks from positions of top and bottom surfaces of the disk damper to correspond to outer edges of the disks where data is not recorded.

The disk damper may have a ring shape opened at a portion.

The disk protector may extend longitudinally along an outer edge of the disk damper. Meantime, a plurality of disk protectors may be arranged along an outer edge of the disk damper to be spaced apart from each other by a specified interval.

The disk protector and the disk damper may be formed as one unit. The disk protector may be attached as a separate member to the top and bottom surfaces of the disk damper. In the latter case, the disk protector is made of a viscoelastic material.

According to another aspect of the present invention, there is provided a hard disk drive comprising: a base member; a spindle motor installed on the base member; a plurality of data storage disks mounted on the spindle motor; an actuator pivotably installed on the base member and moving a read/write head to a specified position over each of the disks; a disk damper disposed between adjacent disks of the plurality of disks and reducing vibrations of the disks; and a disk protector projecting from top and bottom surfaces of the disk damper a specified height to correspond to outer edges of the disks where data is not recorded.

The disk damper may have a ring-shape opened at a portion embracing an activity scope of the actuator.

According to embodiments of the present invention, when the disks are deflected due to an external shock, only the outer edges of the disks contact the disk protector, thereby preventing data recording surfaces of the disks from being damaged.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which.

DETAILED DESCRIPTION OF EMBODIMENT

Figure 1:
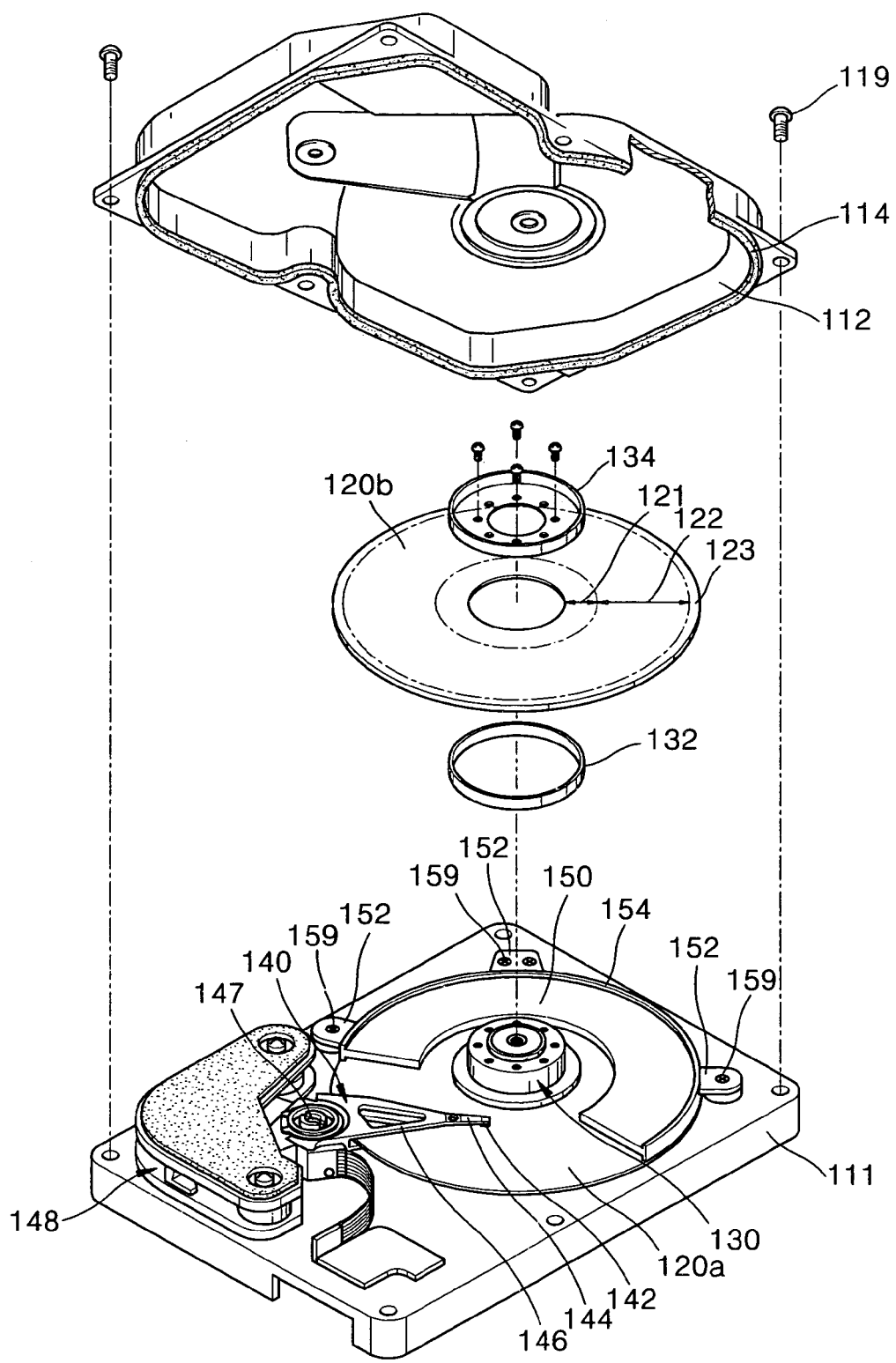
FIG. 1 is an exploded perspective view of a hard disk drive (HDD) having a disk damper and a disk protector according to an exemplary embodiment of the present invention.

Reference will now be made in detail to an embodiment of the present invention, examples of which are illustrated in the accompanying drawings, wherein like reference numerals refer to the like elements throughout. The embodiment is described below in order to explain the present invention by referring to the figures.

Figure 2:
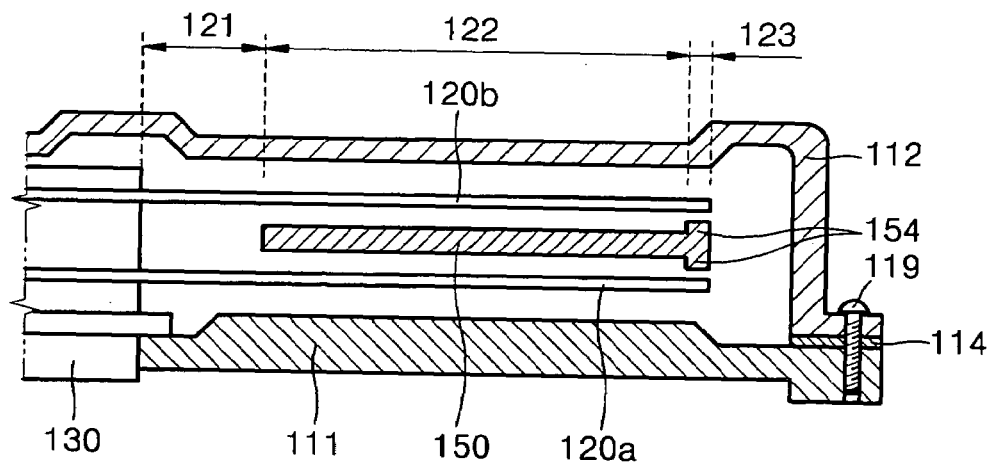
FIG. 2 is a partial sectional, elevational view of the HDD shown in FIG. 1.

FIG. 1 is an exploded perspective view of a hard disk drive (HDD) having a disk damper and a disk protector according to an embodiment of the present invention, and FIG. 2 is a partial sectional elevational view of the HDD shown in FIG. 1.

Referring to FIGS. 1 and 2, a HDD includes data storage disks 120a and 120b, a spindle motor 130 for rotating the disks 120a and 120b, and an actuator 140 for moving a read/write head (not shown) to a specified position over each of the disks 120a and 120b.

The disks 120a and 120b, the spindle motor 130, and the actuator 140 are enclosed and protected by a base member 111 and a cover member 112. The base member 111 and the cover member 112 are attached to each other by a plurality of fastening screws 119. Here, a gasket 114 is inserted between the base member 111 and the cover member 112 to prevent dust or humidity from entering the inside of the HDD. The gasket 114 is made of a viscoelastic material (e.g., rubber) and aids in reducing vibrations in the HDD.

The plurality of disks 120a and 120b that are data recording media are mounted on and rotated by the spindle motor 130. Each of the disks 120a and 120b has a parking zone 121 in an inner circumferential side where the read/write head is stationed when the HDD stops running. An outer circumferential side of the disks 120a and 120b contains a data zone 122 where data is recorded. Also, each of the disks 120a and 120b has an outer portion beyond the data zone 122, that is, an outer edge 123 where data is not recorded.

The spindle motor 130 rotates the disks 120a and 120b, and is installed on the base member 111. If the plurality of disks 120a and 120b are mounted on the spindle motor 130 as described above, a ring-shaped spacer 132 for maintaining an interval between the disks 120a and 120b is inserted between the disks 120a and 120b, and a disk clamp 134 for preventing the separation of the disks 120a and 120b is fastened to a top end portion of the spindle motor 130.

The actuator 140 moves the read/write head (not shown) for writing or reading data on the disks 120a and 120b to a specified position on each of the disks 120a and 120b, and is pivotably installed on the base member 111. In detail, the actuator 140 includes a swing arm 146 rotatably coupled to a pivot 147 that is installed on the base member 111, a suspension 144 for elastically biasing a slider 142 with the read/write head thereon facing a surface of each of the disks 120a and 120b, and a voice coil motor (VCM) 148 for rotating the swing arm 146.

The VCM 148 is controlled by a servo control system, and rotates the swing arm 146 in a direction according to Fleming's Left Hand Rule due to an interaction between current input to a VCM coil and a magnetic field formed by magnets. That is, when the HDD is turned on and the disks 120a and 120b begin to rotate, the VCM 148 rotates the swing arm 146 clockwise to move the slider 142 with the read/write head thereon from the parking zone 121 to the data zone 122 of the respective disks 120a and 120b. The slider 142 is elevated a specified height above the surface of the disks 120a and 120b due to a lifting force generated by the rotating disks 120a and 120b. In this state, the head mounted on the slider 142 reads or writes data on the recording surface of the disks 120a and 120b. Conversely, when the HDD is not in operation, that is, when the disks 120a and 120b are not rotating, the VCM 148 rotates the swing arm 146 counterclockwise to park the head in the parking zone 121 of the respective disks 120a and 120b.

There are two methods of parking the head: a contact start stop method (CSS) and a ramp loading method. The ramp loading method uses a ramp (not shown) outside the disks 120a and 120b and parks the head on the ramp. Embodiments of the present invention, including the present embodiment, can be applied to HDDs using the ramp loading method as well as the CSS method.

The HDD according to the present embodiment includes a disk damper 150 for deadening vibrations of the disks 120a and 120b and a disk protector 154 for protecting data recording surfaces of the disks 120a and 120b from an external shock.

The disk damper 150 has a thin plate shape, and is disposed between the disks 120a and 120b. As shown, if the two disks 120a and 120b are mounted on the spindle motor 130, one disk damper 150 is disposed between the two disks 120a and 120b, and if three or more disks are mounted on the spindle motor 130, each disk damper is disposed between adjacent disks of the plurality of disks. The disk damper 150 is fixedly supported on the base member 111. To this end, a plurality of support protrusions 152 protrude from an outer periphery of the disk damper 150. The support protrusions 152 are fixed to the base member 111 using fixing screws 159.

An interval between a top surface of the disk damper 150 and a bottom surface of the disk 120b facing the top surface of the disk damper 150, and an interval between a bottom surface of the disk damper 150 and a top surface of the disk 120a respectively range from 0.3 mm to 0.5 mm. If the interval between the disk damper 150 and each of the disks 120a and 120b is sufficiently narrow, vibrations of the disks 120a and 120b can be reduced by damping action of air flowing between the disks 120a and 120b.

The disk damper 150 has a large area but not interfere with other elements of the HDD, for example, the actuator 140. This is because the larger the area of the disk damper 150 facing the disks 120a and 120b, the more effectively the air is damped. Specifically, the disk damper 150 has a ring shape opened at a portion embracing an activity scope of the actuator 140.

The disk protector 154 is formed on disk facing surfaces of the disk damper 150, that is, top and bottom surfaces of the disk damper 150. The disk protector 154 prevents the data recording surface, that is, the data zone 122, of each of the disks 120a and 120b from being damaged due to a contact with the disk damper 150.

In detail, the disk protector 154 projects from the top and bottom surfaces of the disk damper 150 a specified height to correspond to the outer edges 123 of the respective disks 120a and 120b. The disk protector 154 may longitudinally extend along an outer edge of the disk damper 150. Accordingly, the disk protector 154 has a ring shape opened at the portion embracing the activity scope of the actuator 140, like the disk damper 150.

The disk protector 154 and the disk damper 150 may be formed as one unit. For example, the disk damper 150 and the disk protector 154 may be manufactured together by pressing an aluminium plate, or using aluminium die-casting or plastic injection molding. In this case, since an additional process for the disk protector 154 is not required, manufacturing process and costs are reduced and it becomes easier to handle the disk damper 150 and the disk protector 154.

As previously described, since the disk protector 154 projects from the top and bottom surfaces of the disk damper 150, an interval between the outer edge 123 of each of the disks 120a and 120b and the disk protector 154 is smaller than an interval between the data zone 122 of the respective disks 120a and 120b and the disk damper 150.

Consequently, if an abrupt external shock is applied to the HDD (e.g., during a shock test) and the disks 120a and 120b are deflected, the outer edges 123 of the disks 120a and 120b, where data is not recorded, first contact the disk protector 154, thereby preventing the disk damper 150 from touching the data zone 122 of the disks 120a and 120b.

Modified examples of the disk protector will be explained with reference to FIGS. 3 and 4.

Figure 3:
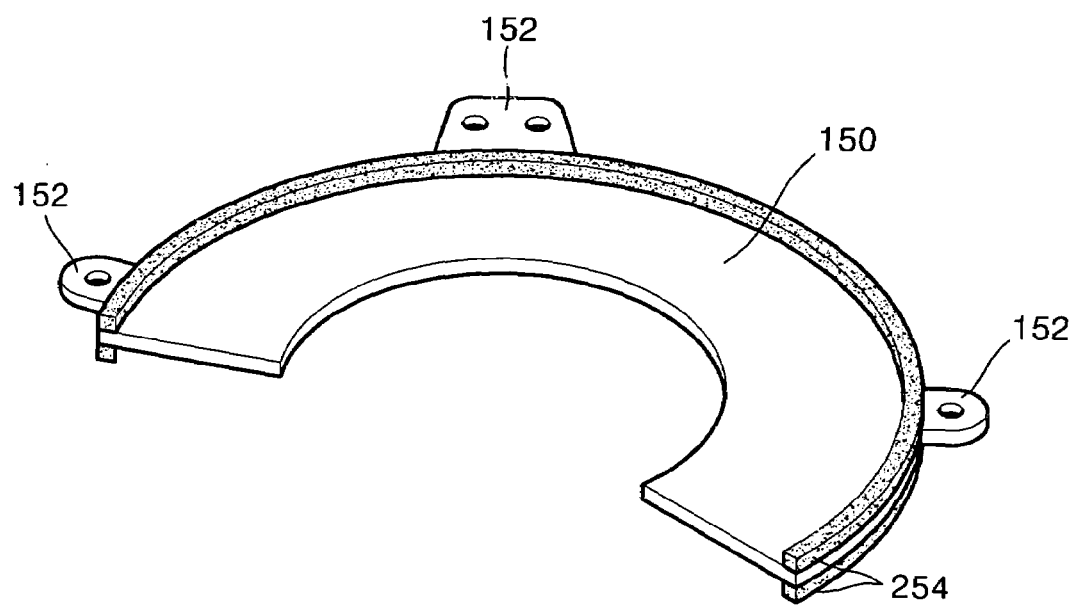
FIG. 3 is a perspective view of a first modified example of a disk protector of the HDD shown in FIG. 1.

FIG. 3 is a perspective view of a first modified example of the disk protector of the HDD shown in FIG. 1.

Referring to FIG. 3, a disk protector 254 may be manufactured as a separate member and then is attached to top and bottom surfaces of the disk damper 150. Here, the disk protector 254 may be made of a viscoelastic material, such as natural rubber or synthetic rubber, which has shock absorbing properties and has softer than the surfaces of the disks 120a and 120b. As such, when the disks 120a and 120b collide with the disk protector 254 due to an external shock, the disk protector 154 absorbs the shock and prevents the surfaces of the disks 120a and 120b from being damaged. Accordingly, the disk protector 254 can prevent particles from being generated due to the damage to the surfaces of the disks 120a and 120b. If particles are produced due to the collisions, the data zone 122 is damaged and data writing and reading functions also deteriorate. Accordingly, it is advantageous to prevent the particles as much as possible.

Figure 4:
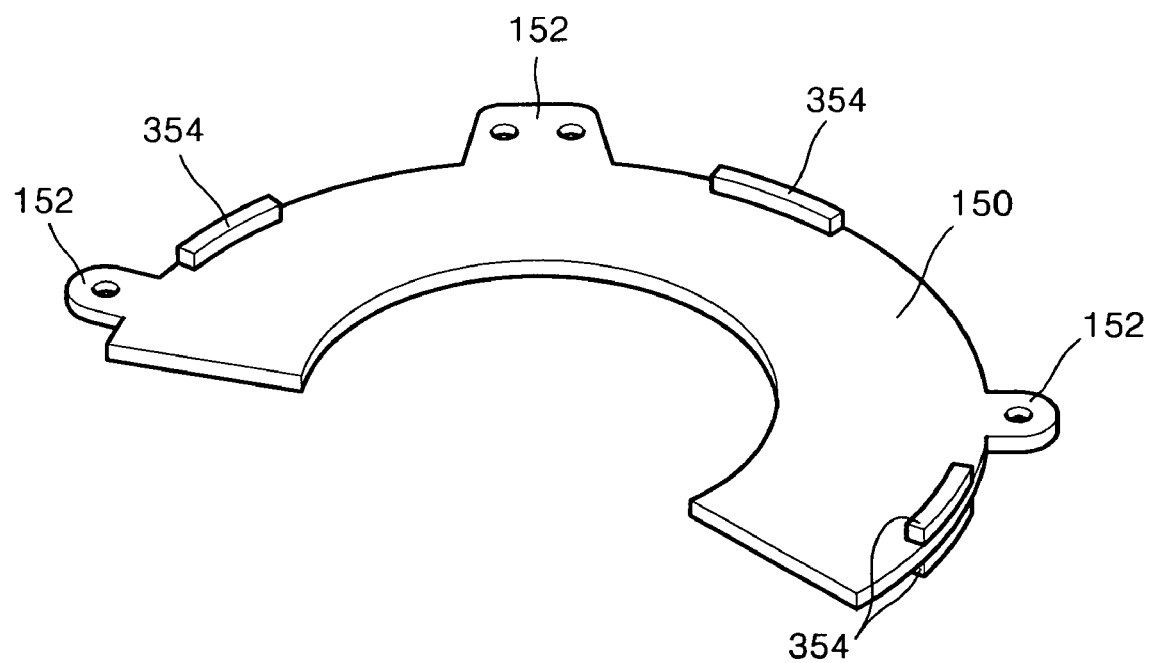
FIG. 4 is a perspective view of a second modified example of the disk protector of the HDD shown in FIG. 1.

FIG. 4 is a perspective view of a second modified example of the disk protector of the HDD shown in FIG. 1.

Referring to FIG. 4, a plurality of disk protectors 354, for example, three disk protectors, may be arranged along the outer edge of the disk damper 150 to be spaced a specified interval apart. The plurality of disk protectors 354 be arranged respectively adjacent to the support protrusions 152.

The plurality of disk protectors 354, as previously described, may be formed with the disk damper 150 as one unit, or may be manufactured as separate members and then be attached to the top and bottom surfaces of the disk damper 150.

Further, the plurality of disk protectors 354 may be made of a viscoelastic material, as explained in FIG. 3.

As previously described, even though an abrupt external shock is applied to the HDD (e.g., during a shock test) and thus the disks are deflected, the outer edges of the disks, where data is not recorded, first contact the disk protector, thereby preventing the data recording surfaces of the disks from touching the disk damper. Furthermore, during the installation of the disk damper, the risk of contact between the disk damper and the data recording surfaces of the disks is less. As a result, damage to the data recording surfaces of the disks can be prevented.

Although an embodiment of the present invention have been shown and described, the present invention is not limited to the described embodiment. Instead, it would be appreciated by those skilled in the art that changes may be made to the embodiment without departing from the principles and spirit of the invention, the scope of which is defined by the claims and their equivalents.

What is claimed is:

1. A disk damper disposed between adjacent disks mounted on a spindle motor and reducing vibrations of the disks, the disk damper comprising:
   a disk protector projecting, by a specified height, toward the disks from top and bottom surfaces of the disk damper in locations corresponding to outer edges of the disks where data is not recorded,
   wherein the disk protector is arranged only along an outer edge of the disk damper, is a plurality of disk protectors separated a specified distance from each other.

2. The disk damper of claim 1, wherein the disk damper has a ring shape with an opened portion.

3. The disk damper of claim 1, wherein the disk protector extends along an outer edge of the disk damper.

4. The disk damper of claim 1, wherein the disk protector and the disk damper are formed as one unit.

5. The disk damper of claim 1, wherein the disk protector is attached as a separate member to the top and bottom surfaces of the disk damper.

6. The disk damper of claim 5, wherein the disk protector is made of a viscoelastic material.

7. A hard disk drive comprising:
   a base member;
   a spindle motor installed on the base member;
   a plurality of data storage disks mounted on the spindle motor;
   an actuator pivotably installed on the base member and moving a read/write head to a specified position over each of the disks;
   a disk damper disposed between adjacent disks of the plurality of disks and reducing vibrations of the disks; and
   a disk protector uniformly projecting from top and bottom surfaces of the disk damper a specified height to correspond to outer edges of the disks where data is not recorded,
   wherein the disk protector is arranged only along an outer edge of the disk damper and is a plurality of disk protectors separated a specified distance from each other.

8. The hard disk drive of claim 7, wherein the disk damper has a ring-shape opened at a portion embracing an activity scope of the actuator.

9. The hard disk drive of claim 7, wherein the disk protector extends longitudinally along an outer edge of the disk damper.

10. The hard disk drive of claim 7, wherein the disk protector and the disk damper are formed as one unit.

11. The hard disk drive of claim 7, wherein the disk protector is attached as a separate member to the top and bottom surfaces of the disk damper.

12. The hard disk drive of claim 11, wherein the disk protector is made of a viscoelastic material.

13. A hard disk drive comprising:
    a plurality of disks mounted on a spindle;
    a disk damper disposed between adjacent disks of the plurality of disks and reducing vibrations of the disks; and
    a disk protector disposed at an outer edge of the disk damper in a position corresponding to outer peripheries of the adjacent disks where data is not stored and extending from opposing surfaces of the disk damper toward the adjacent disks so that the peripheries of disks contact the disk protector before data storage areas of the disks contact the disk damper when the disks vibrate,
    wherein the disk protector is arranged only along an outer edge of the disk damper and is a plurality of disk protectors separated a specified distance from each other.

14. The hard disk drive of claim 13, wherein the disk damper has a plate-like shape.

15. The hard disk drive of claim 13, wherein the disk damper includes support protrusions extending from an outer periphery of the disk damper, and wherein the disk damper is mounted to a housing of the HDD at the support protrusions.

16. The hard disk drive of claim 13, wherein the disk protector is rubber.

17. The hard disk drive of claim 13, wherein the disk protector is a plurality of pairs of disk protectors, the pairs including first and second portions extending in opposing directions from opposing sides of the disk damper.

* * * * *

UNITED STATES PATENT AND TRADEMARK OFFICE
CERTIFICATE OF CORRECTION

| | | |
|---|---|---|
| PATENT NO. | : 7,327,530 B2 | Page 1 of 1 |
| APPLICATION NO. | : 11/149303 | |
| DATED | : February 5, 2008 | |
| INVENTOR(S) | : Jae-suk Lee et al. | |

It is certified that error appears in the above-identified patent and that said Letters Patent is hereby corrected as shown below:

Title Page, Column 2 Item [57] (Abstract), Line 10, change "form" to --from--.

Signed and Sealed this

Eighth Day of July, 2008

JON W. DUDAS
*Director of the United States Patent and Trademark Office*